United States Patent [19]

Von Stein et al.

[11] 4,079,836
[45] Mar. 21, 1978

[54] BASKETS AND SUPPORT THEREFOR, FOR MASS MERCHANDISING HANDLING AND DISPLAY OF GOODS

[75] Inventors: Gene Von Stein, Oklahoma City; Don A. Stover, Jr., Moore, both of Okla.; Harry B. Musser, Germantown, Tenn.

[73] Assignee: Folding Carrier Corporation, a division of Unarco Industries, Inc., Chicago, Ill.

[21] Appl. No.: 631,365

[22] Filed: Nov. 12, 1975

[51] Int. Cl.² .......................... A47F 3/14; B65D 21/00
[52] U.S. Cl. ..................................... 206/513; 206/510; 206/511; 211/126; 211/181; 220/19
[58] Field of Search ................. 211/71, 126, 128, 181; 206/503, 505, 506, 507, 509, 510, 511, 513, 515, 519; 220/19

[56] References Cited

U.S. PATENT DOCUMENTS

| 2,646,186 | 7/1953 | Russell | 206/510 |
| 2,736,453 | 2/1956 | Russell | 206/510 |
| 3,211,326 | 10/1965 | Davis | 206/510 |
| 3,401,828 | 9/1968 | Bockenstette | 206/518 |
| 3,481,507 | 12/1969 | Sanders | 206/507 |
| 3,704,791 | 12/1972 | Young, Jr. | 206/509 |

FOREIGN PATENT DOCUMENTS

| 251,249 | 11/1960 | Australia | 211/126 |
| 572,165 | 11/1958 | Belgium | 211/126 |
| 1,133,522 | 7/1962 | Germany | 211/126 |

Primary Examiner—Roy D. Frazier
Assistant Examiner—Terrell P. Lewis
Attorney, Agent, or Firm—Norman Lettvin

[57] ABSTRACT

A basket, with no movable parts, for holding and displaying goods is provided with opposed bails at the upper end and support feet at the lower end, constructed and arranged to provide secure but separable stacking character by a separable interconnection of bails and feet of two similar baskets, wherein the basket construction effects resilient snap-together and locking of bails and feet to provide a stacking, or columnar, arrangement with great stability. Additional safety means to prevent inadvertent unstacking is provided by cooperating elements on the baskets. Two baskets may be nested, for reducing volume occupied by baskets when stored or shipped, by use of interfitting such baskets in an inverted and offset arrangement that is accommodated by slots defined adjacent basket corners. A base basket and support base combination provides a very stable construction, that may have additional baskets stacked in a column upon the base basket, by use of wire elements that are shaped and arranged to interfit for maximizing resistance by the base basket to tipping relative to its support base.

17 Claims, 17 Drawing Figures

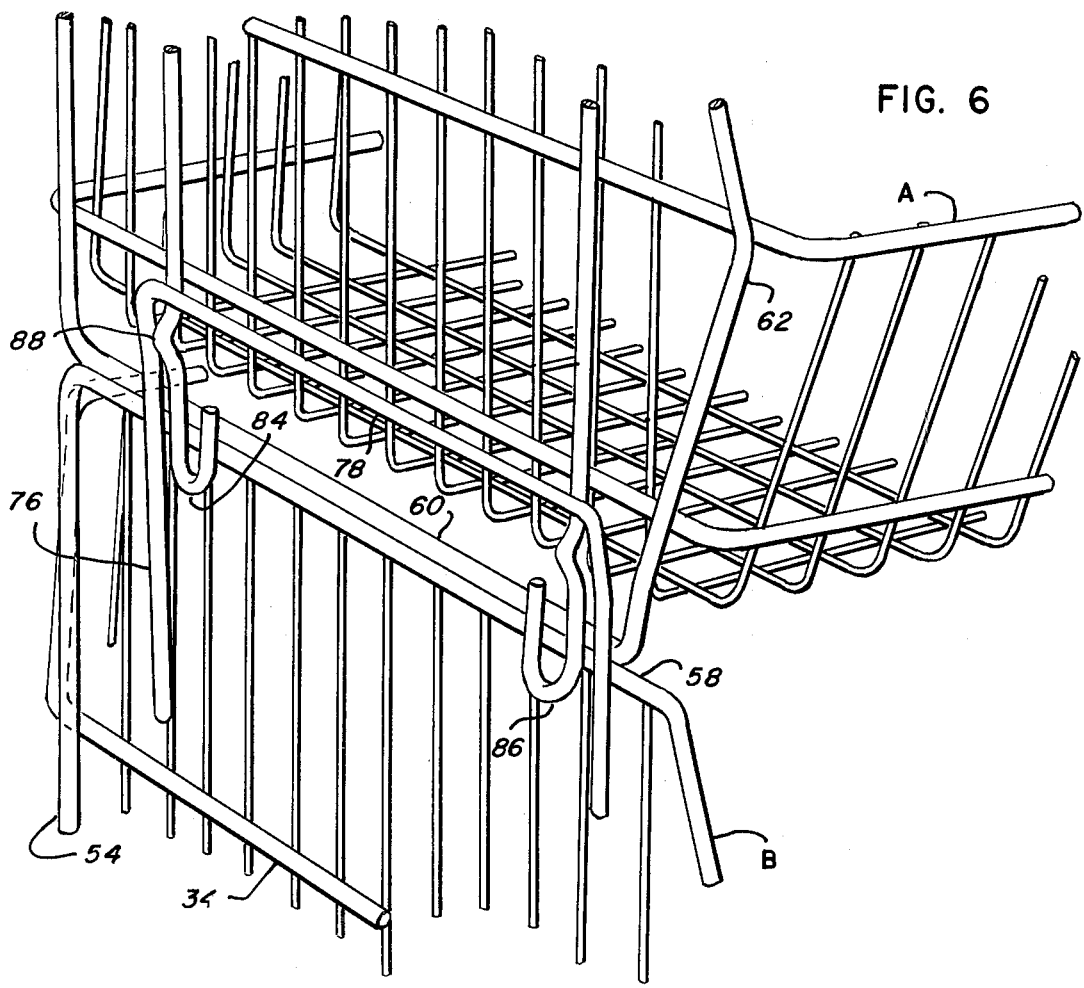
FIG. 6
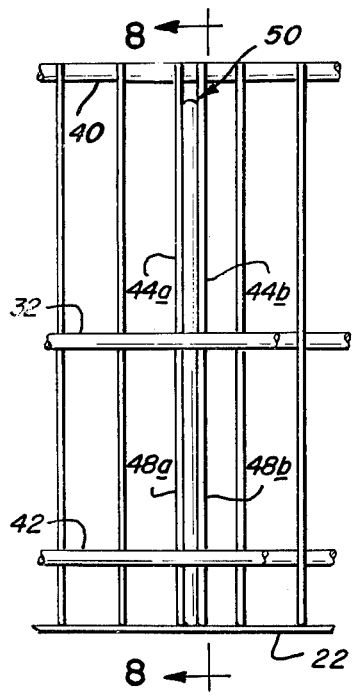
FIG. 7
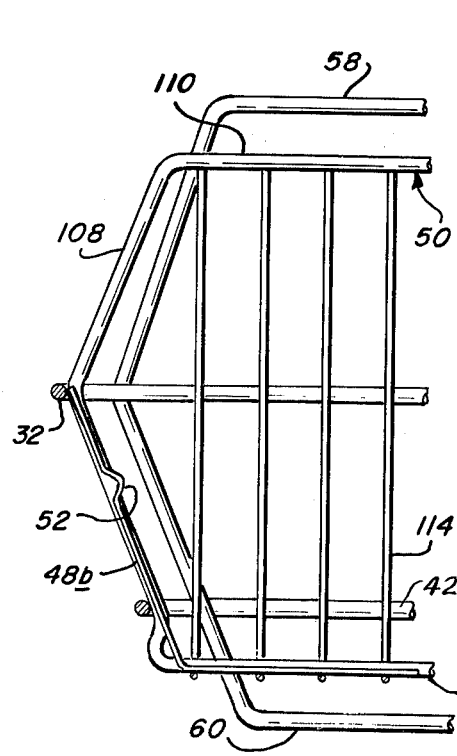
FIG. 8
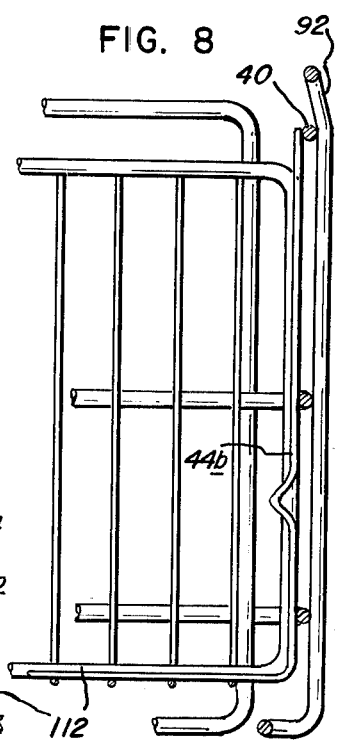

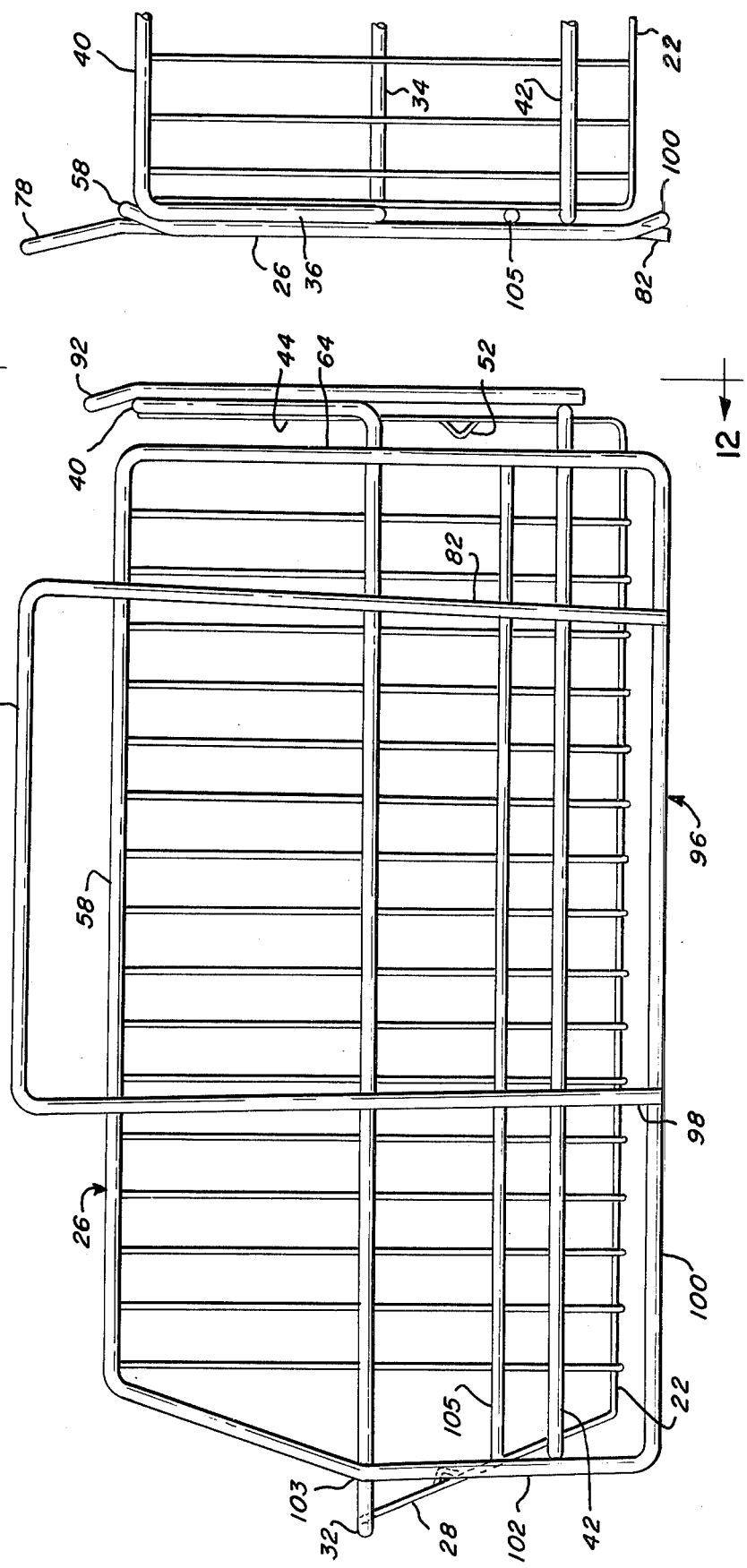

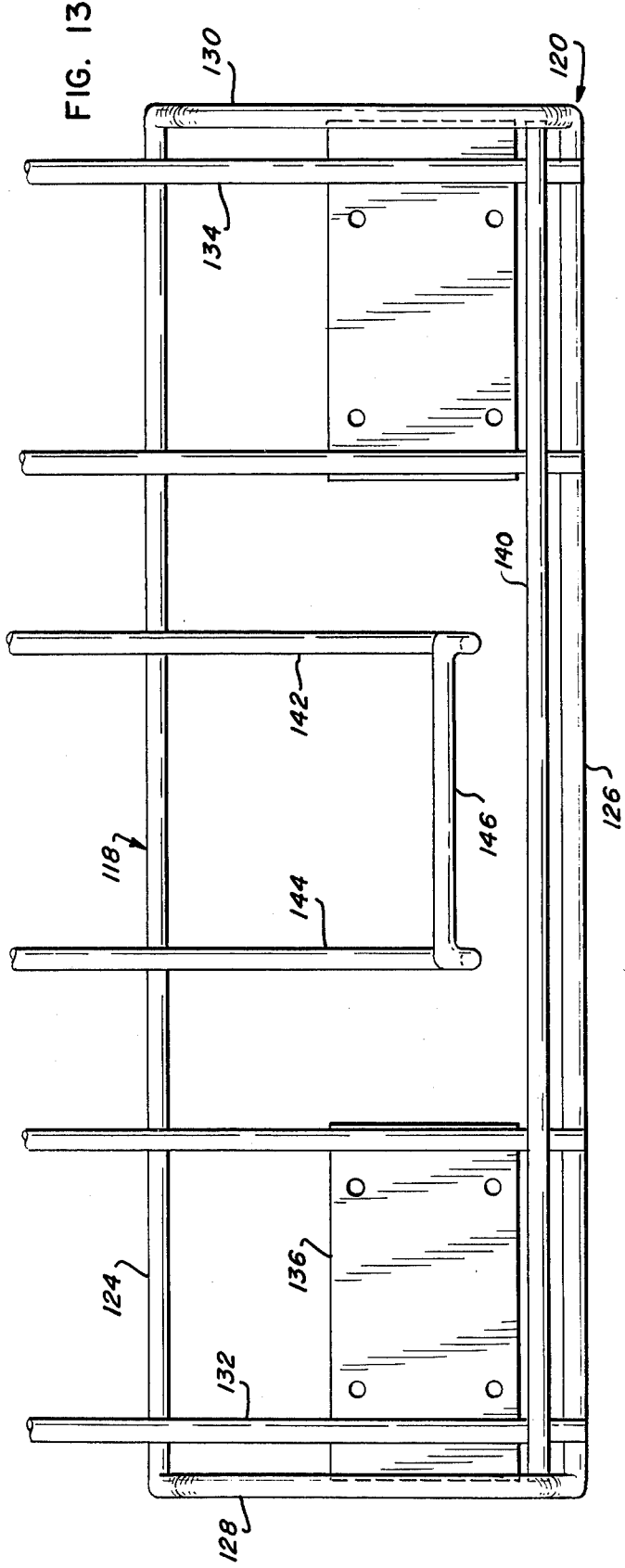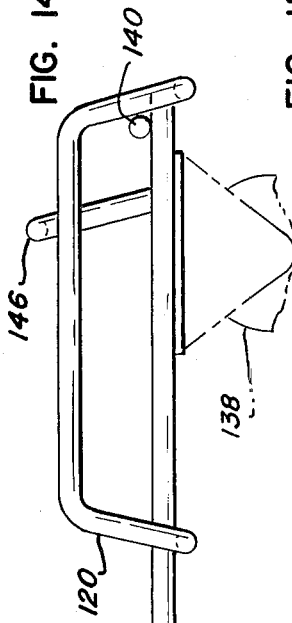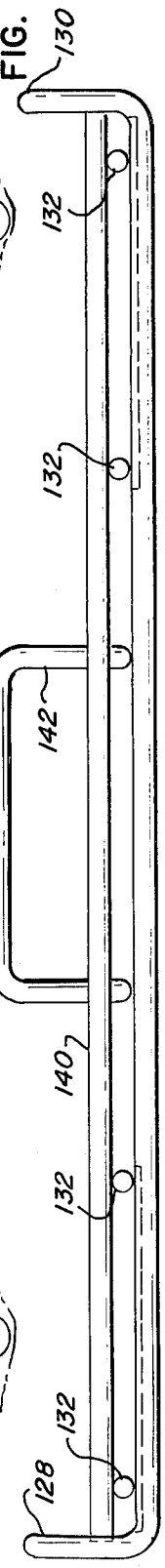

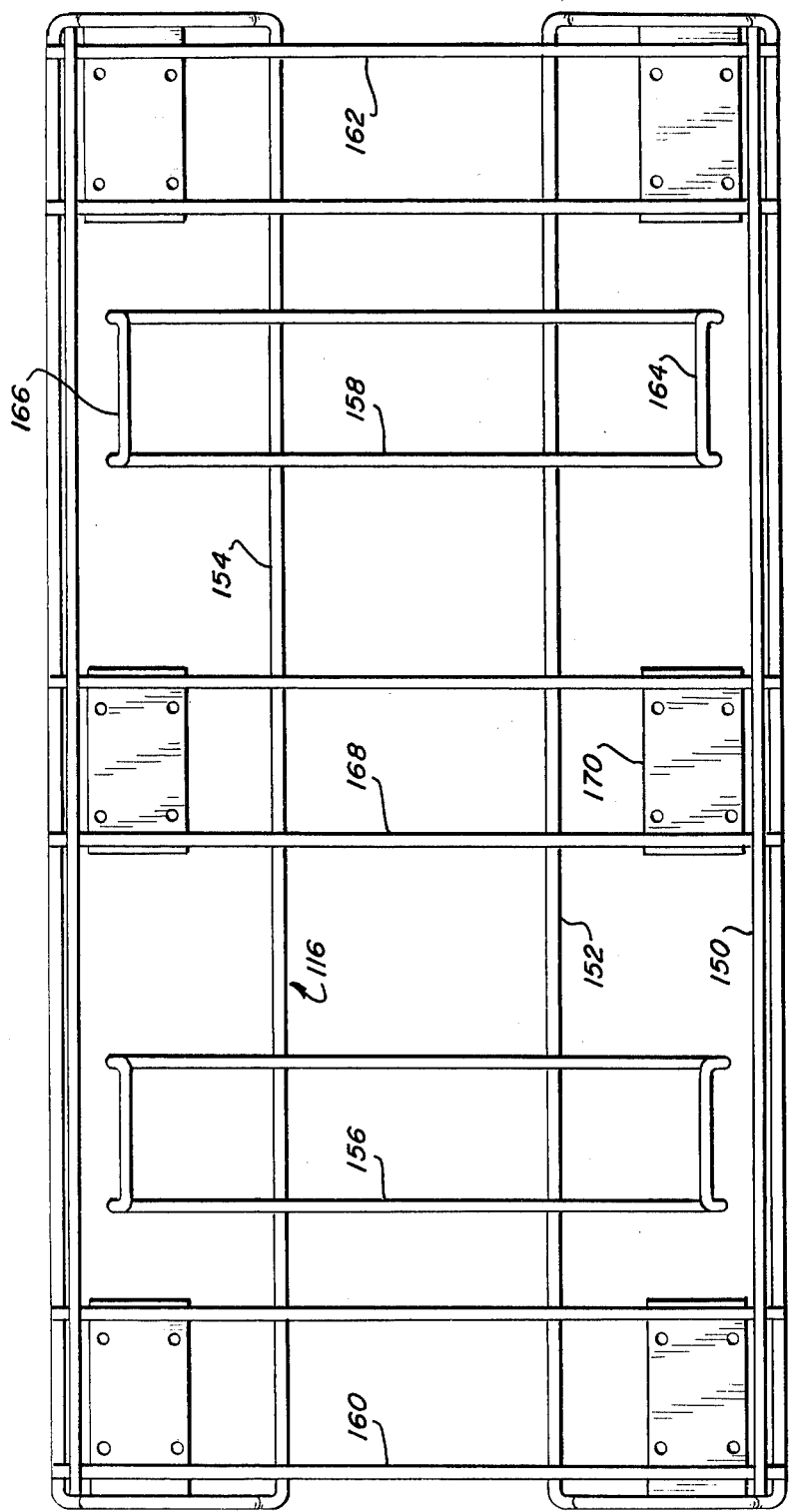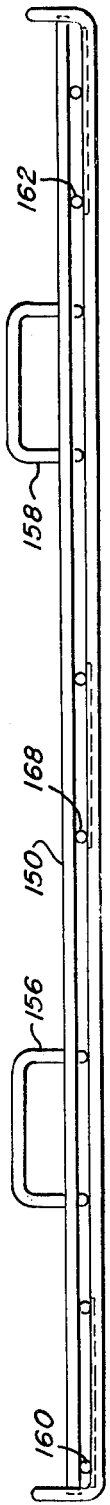
FIG. 16
FIG. 17

BASKETS AND SUPPORT THEREFOR, FOR MASS MERCHANDISING HANDLING AND DISPLAY OF GOODS

BACKGROUND OF THE INVENTION

This invention relates to a portable container or bin, and more particularly, to a basket which may be stacked upon another basket without obstructing the lading-carrying space of the basket and which may be partially nested or telescoped within another basket to occupy the other basket's lading-carrying space.

There are many types of stackable and nestable baskets available for use with a large variety of products. A common characteristic of these baskets are that they are open-ended or without a top to permit easy accessability. Generally, these baskets are made of sheet material, wire or plastic, in order to provide lightness and visual control of the contents. Engineering and design criteria generally necessitate that the baskets occupy the least possible storage space during nesting, for purpose of storage or shipping, and maximize the lading-carrying space during stacking.

In an effort to achieve nesting, prior art containers have heretofore been designed with tapered sidewalls or end walls, resulting in diminished lading-carrying capacity during stacking. It has therefore been found that baskets having a plurality of perpendicular upright walls generally optimize lading-carrying space and capacity during stacking. However, such basket construction makes nesting difficult.

Stacking baskets are old as disclosed in U.S. Pat. Nos. 1,936,164, 2,554,232 and 2,662,662. Some stackable baskets have been designed with inwardly or upwardly projecting shoulders for engaging or supporting the bottom frame of another basket.

Others have heretofore sought to provide baskets that selectively nest as well as stack upon each other. Such prior constructions generally have used movable elements or geometrical features that permit of alternate use, but stability in such instances normally relies upon gravity of interference between basket wall members. For example see U.S. Pat. Nos. 2,252,964, 2,931,535, and 3,409,163.

U.S. Pat. Nos. 3,039,643, 3,481,507, and 3,622,031 disclose utility in rotating the basket either 90° or 180° about a vertical axis to effect stacking rather than nesting.

BRIEF SUMMARY OF THE INVENTION

It is an object of the present invention to provide an improved, stackable basket which is constructed and arranged to snap-fit and interlockingly stack upon another basket.

To this end, the end walls of the stackable basket are arranged vertically and generally perpendicularly to a plane defined by the basket bottom with each of the end walls including an endless loop-like peripheral frame providing upper and lower end runs. Stacking means in the form of a resilient U-shaped bail and resilient shoulder-defining feet are provided in each of the end walls, with the bail extending above the upper run and portions of feet extending below the lower run, so that during stacking the feet of one basket enter the bail of another basket and snap-fittingly engage the other basket's upper run, as the shoulders of one basket interlockingly and resiliently engage the bail of the other basket.

Another object of this invention is to provide baskets having improved safety features for preventing the basket from tipping over when a downward force is applied to the front rim of the basket.

Still a further object of this invention is to provide (1) a nestable basket construction of improved character, (2) where the nesting character is not achieved at the expense of the lading-carrying capacity of the basket, or at the expense of the ability of nested baskets to be readily separated, (3) where the nesting character is maximized to the extent that loss of vertical space during nesting is at a minimum, (4) where the nesting character is accomplished simply by turning one basket upside down relative to the basket beneath and then shifting the baskets laterally of each other so that the end walls of the two baskets are in adjacent planes, (5) where the nesting character includes slideways or slots provided in each of the basket's end walls for receiving a side wall of the other basket and (6) where the nesting character assures nesting without jamming.

BRIEF DESCRIPTION OF THE DRAWINGS

FIG. 6 is an enlarged fragmentary perspective end-view of two stackable baskets in stacking relationship;

FIG. 7 is a fragmentary front view of a stackable basket with a wire divider or partition;

FIG. 8 is a fragmentary end view of a stackable basket with a wire divider or partition taken substantially along line 8—8 of FIG. 7;

FIG. 11 is an end view of a base basket in accordance with principles of the present invention;

FIG. 12 is a fragmentary rearward view of a base basket taken substantially along line 12—12 of FIG. 11;

FIG. 13 is an enlarged fragmentary top plan view of the single capacity dolly shown in FIG. 3;

FIG. 14 is an end view of the single capacity dolly;

FIG. 15 is a front elevational view of the single capacity dolly;

FIG. 16 is a top plan view of the double capacity dolly shown in FIG. 1; and

FIG. 17 is a front elevational view of the double capacity dolly.

DETAILED DESCRIPTION OF THE ILLUSTRATIVE EMBODIMENT

Stackable Baskets

Figure 5:
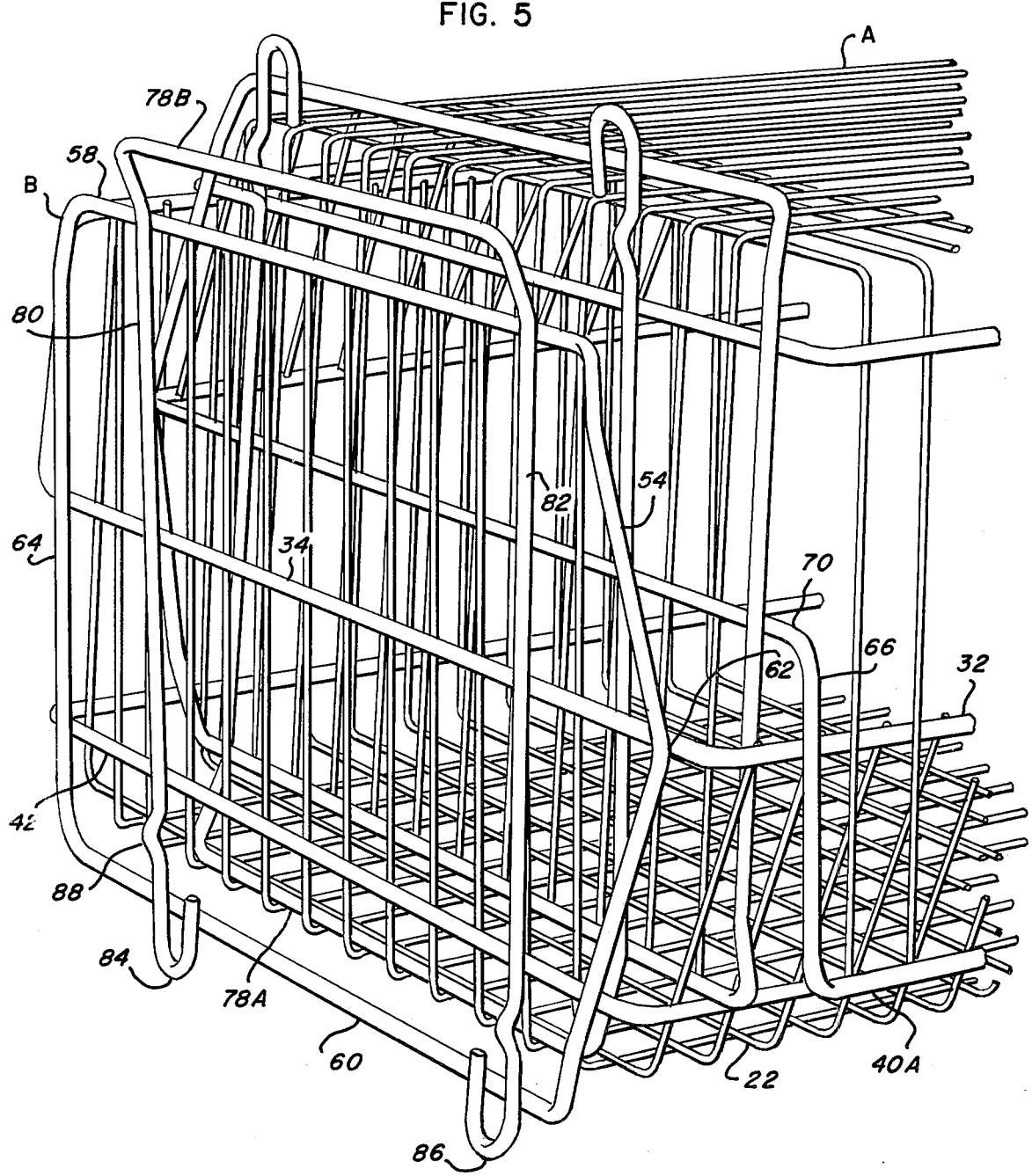
FIG. 5 is an enlarged fragmentary perspective end-view of two stackable baskets positioned in nesting relationship.
Figure 9:
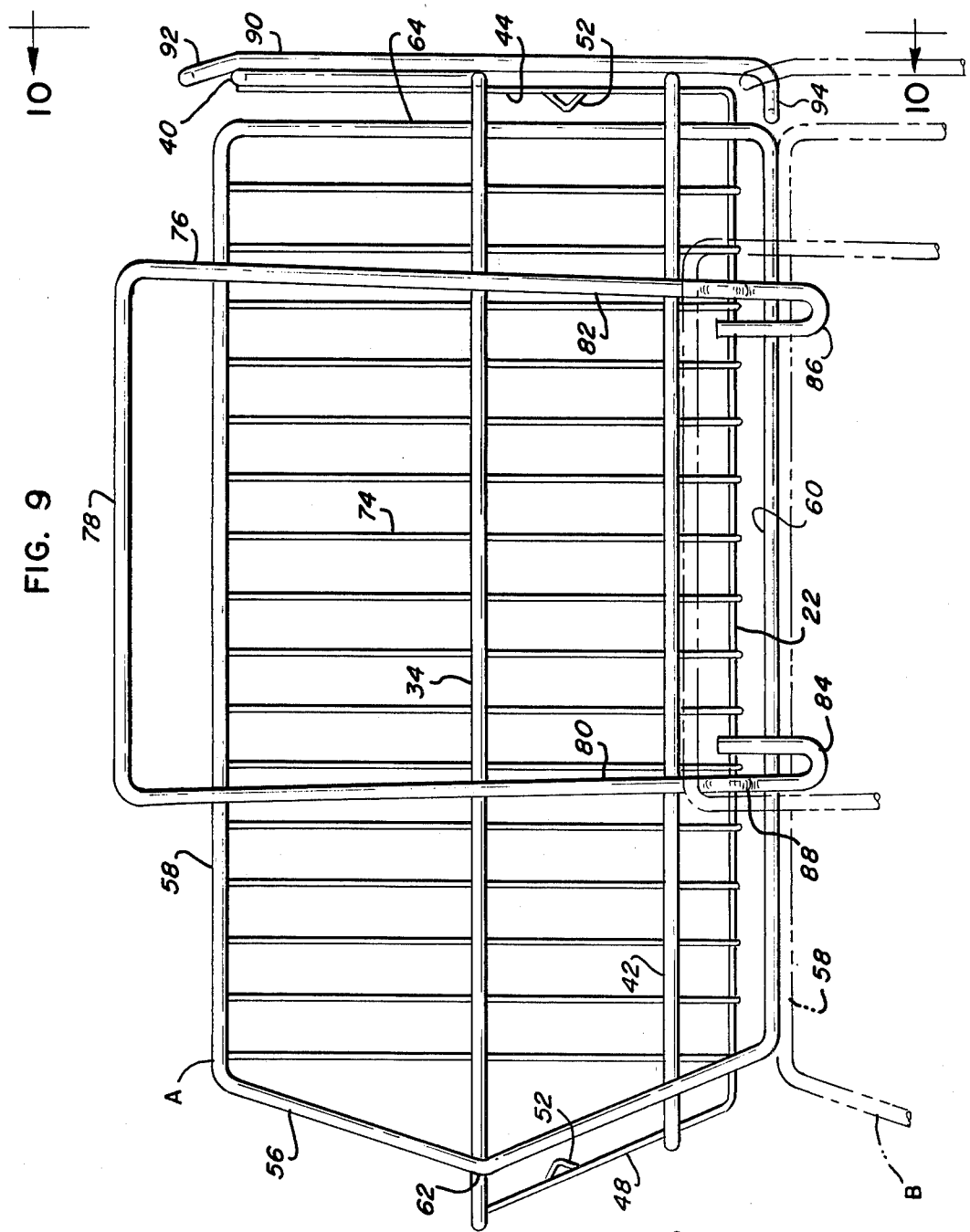
FIG. 9 illustrates in solid line an end view of a stackable basket and in broken line or phantom a fragmentary portion of another stackable basket in stacking relationship therewith.
Figure 10:
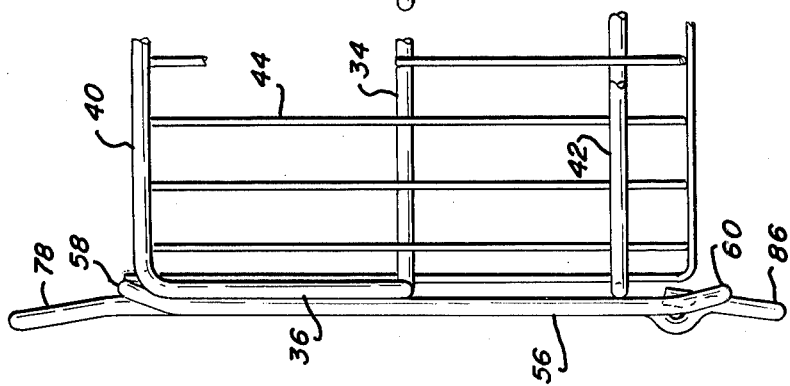
FIG. 10 is a fragmentary rearward view of a stackable basket taken substantially along line 10—10 of FIG. 9.

Referring now to the drawings, FIG. 6 shows two identical wire baskets, or bins, stacked one upon the other, while FIG. 5 shows two identical baskets nested. Since the baskets are identical, the same numerals will be used to describe identical elements of the basket. To distinguish the baskets, the top basket will sometimes be referred to as the "A" basket, and the lower basket will sometimes be called "B" basket. As seen in the figures, the basket is generally indicated at 20 and includes a generally rectangular basket bottom 22 defined by a grid of cross wires that are welded together at their point of contact. One set of wires of the grid may be part of the wires that form the vertical end walls 24 and 26 of the basket, and another set may include portions of the wires that form the upright front and rear sidewalls 28 and 30, respectively, of the basket.

In the particular construction illustrated, the front wall is inclined outwardly from the basket bottom and is of a lesser vertical height than the vertical rear wall and end walls so as to define an access opening into the interior lading-carrying space of the basket, the top edge of the front wall being defined by the forward run or rail 32 of an endless, generally horizontal frame member 34, which is of a larger gauge size and dimension than the cross wires of the basket bottom. The horizontal frame member serves to rigidify and strengthen the upright walls of the basket, with the ends of the forward rail bent to extend horizontally and continually across the end walls, until reaching the rear wall where they extend generally upright to provide the ends 36 and 38 of the rear wall. The horizontal frame member further includes a rearward run or rail 40 horizontally interconnecting the uppermost ends of the rear wall to provide the rear wall's top edge.

A second rigidifying frame member 42, of a similar gauge size as the horizontal frame member, defines a horizontal loop-like rib extending along the upright walls of the basket at a position slightly above the basket bottom. The lower rigidifying frame member 42 is formed by an endless or continuous wire, as does the horizontal frame member, and is located in a horizontal plane spaced parallel and below a horizontal plane defined by the end portions and forward rail of the horizontal frame member.

In the illustrative embodiment, the rear wall includes a series of equally spaced, parallel, vertical wires 44 located generally along aliquot horizontal sub-portions of the rear wall, each of the vertical wires being welded to the inner surfaces of the horizontal frame member 34 and the lower rigidifying frame member 42 and turned inwardly and horizontally along the basket bottom at 46 until reaching the front wall where it is inclined upwardly at 48 to the height of the forward rail or upper front edge 32. The inclined wires of the front wall are welded to the inner surfaces of the horizontal frame member 34 and the lower rigidifying frame member 42 and lie in a common vertical plane with the rearward vertical wires 44.

The vertical wires of the rear wall may also include a pair of parallel, closely adjacent vertical wires 44a and 44b, lying in a common vertical plane with a pair of parallel, closely adjacent inclined wires, 48a and 48b, respectively, of the front wall so as to provide means for receiving a wire partition or divider 50. Each of the partition-receiving vertical wires and inclined wires are bent inward to define and carry an inwardly-projecting shoulder element 52 and are located longitudinally between and parallel to the end walls. In the illustrative embodiment the vertical wires 44a and 44b and the inclined wires 48a and 48b generally vertically bisect the front and rear walls, so that the wire partition or divider 50 will sub-divide the lading-carrying space into two generally equal sub-compartments, but it is to be understood that these wires could be located closer to one end wall than the other.

Referring now to the end walls 24 and 26, an irregularly-shaped vertically elongated wire loop of a gauge size and dimension similar to the horizontal frame member 34 is welded to the end portions of horizontal frame member and the lower rigidifying frame member 42, so as to define an upright, peripheral end frame member 54 or 56 which is bent to provide an upper horizontal end runner 58, providing the upper edge of the end wall, and a lower horizontal end runner 60 descending below the basket bottom to provide the lower edge of the end wall. The upper and lower horizontal runners lie generally in a common vertical plane with both the horizontal frame member and the lower rigidifying frame member, with the forward end of the upper horizontal runner turned and inclined downwardly toward the upper edge and corner of the front wall. The forward end of the lower horizontal runner is also turned and inclined upwardly toward the upper edge and corner of the front wall to form a rounded apex 62 welded to the outer surface of the horizontal frame member 34 adjacent said upper edge and corner. Rearwardly, the upper and lower horizontal runners are bent to provide an upright generally-vertical rearward extension 64 extending above upper edge 40 of the rear wall and welded to the outer rearward side of the horizontal frame member.

An important feature of this invention is that the upright extensions 64 are spaced forwardly of the rear wall and cooperate with the endwise elements and the upright rearward elements 36 and 38 of the horizontal frame member 34 so as to define a pair of downwardly extending slots or slideways 66 and 68 in the end walls. The vertical extent and forward edge of each slot is defined by that portion of the upright rearward extension 64 extending above the horizontal frame member 34. The bottommost extent of each slot is formed by a horizontal bight portion 70 provided by the endwise elements of the horizontal frame member extending rearwardly of the upright rearward extension 64, while the upright rearward edge of each slot is defined by the end or upright rearward elements 36 or 38 of the rear wall. The horizontal spacing or span between the upright extension 64 and the rear wall is slightly greater than the thickness of the upper end of the front sidewall 28 and defines the horizontal span of the slot. More particularly, the upright extension is spaced from the ends 36 and 38 of the rear wall at a distance slightly greater than the horizontal traces formed by the projection of the inclined wires 48 of the front wall extending above the lower rigidifying frame member 42 upon a horizontal plane coinciding with the lower rigidifying frame member. Thus, each slot is of a size and dimension to receive the upper end of the front wall of another basket "B" during nesting.

The left-hand end wall 24 (as viewed looking toward the front wall) includes a series of parallel vertical wires 72 which are welded along aliquot horizontal sub-portions of the inner surfaces of the upper horizontal end runner 58, the horizontal frame member 34 and the lower rigidifying frame member 42. These vertical end wires 72 are of a similar gauge, size and dimension as the upright side wires 44 and are turned to longitudinally extend along the underside of the basket bottom, until reaching the right-hand end wall where the wires are bent upward to provide a set of vertical end wires 74 along the right-hand end wall 26.

An important feature of this invention is that each end wall 24 and 26 is provided with an inverted vertically-elongated U-shaped resilient wire-frame member 76 whose upper bight defines a U-shaped horizontally-elongated bail 78 and whose legs 80 and 82 diverge downwardly to provide a pair of upright reverse-bent U-shaped feet 84 and 86 extending beneath the lower rigidifying frame member 42. The feet are deformed or bent outwardly at a point slightly above the basket bottom and below the lower rigidifying frame member to provide outwardly-extending shoulders 88. Preferably, the inverted U-shaped end member 76 is formed of wire having some spring-like elasticity or resilience and is of a gauge, size and dimension similar to the peripheral end members 56 and the horizontal frame member 34. The inclined legs 89 and 82 of the U-shaped end member lie generally in a common vertical plane and are welded to the outer surfaces of the peripheral end frame member's upper runner 58 as well as the endwise elements of the horizontal and lower rigidifying frame members 34 and 36.

In the embodiments shown, the bail is positioned slightly closer the rear wall than the front wall and spans about three-fifths the length of the peripheral end frame's upper runner 58. The bail itself extends above the upper runner 58 and is inclined slightly outwardly thereof so as to lie vertically above the feet 84 and 86.

The legs 80 and 82 of the U-shaped frame member 76 are tapered or inclined so that the maximum exterior length of the feet spans a distance less than the interior length of the bail. The unattached end of each foot is in general horizontal alignment with the outwardly-extending shoulders 88 and are spaced intermediate the legs of the U-shaped frame member, with each foot being welded to the outer surface of the peripheral end member's lower runner 60 so that the lowermost extent of the foot extends below the lower runner, while the shoulder element 88 is located above the lower runner. The lowermost extent of each foot is cantilevered and inclined slightly outwardly of the lower runner so as to snap-fittingly engage the upper runner 58 of another basket "A" during stacking.

Referring now to the rear sidewall 30, a rearward continuous or endless irregularly-shaped vertically-elongated wire-frame member 90 defines a safety or stability-enhancing loop-like frame whose upper end or bight provides an inverted, horizontally-elongated U-shaped rearward bail 92 with depending inclined legs 93 converging downwardly to provide a lower, inwardly-extending horizontal bail or hooked foot 94 beneath the basket bottom in general horizontal alignment with the lower end runners 58 and 60. The upper rearward bail extends above the upper edge of the rear wall and is inclined slightly inward to lie generally in a common vertical plane with the upper edge or rearward horizontal runner 40 of the horizontal frame member 34. The leg elements 93 of the rearward frame 90 are welded to the outer surfaces of the upper rearward horizontal runner 40 as well as rearward portions of the lower rigidifying frame member 42. These leg elements are located generally in a common upright plane along central portions of the rear wall and extend below the lower rigidifying frame member 42 and basket bottom, so that the hooked foot 94 has an external longitudinal length slightly less than the interior longitudinal length of the rearward bail 92.

In the illustrative embodiment, the endless or continuous rearward frame member 90 is formed by bending an elongated wire into an irregular loop-like configuration and butt-welding or joining the ends of the loop together. The loops comprising the peripheral end frame members 54 and 56 as well as the horizontal and rigidifying frame members 34 and 42 can be formed in a similar manner.

In order to stack the baskets upon each other, the upper basket A is first vertically aligned above lower basket B, so that the hooked foot 94 and downwardly-extending end feet 84 and 86 of upper basket respectively enters the confines of the interior space defined by the respective rearward and endwise bails 92 and 78 of the lower basket. After this is accomplished, the next step in stacking is to move the baskets A and B toward each other with sufficient force so that the lower end runs 60 of the upper basket contact the upper end runs 58 of the lower basket. Such inter press-fitting action between the baskets A and B will cause the end feet 84 and 86 of the upper basket to snap-fittingly engage against the outer surfaces of the upper end runs of the lower basket while the outwardly projecting shoulders 88 carried by the end feet of the upper basket snap-fittingly interlocks and supports the inward underside of the side bails 78 of the lower basket. Such interaction will further cause the crotch of the upper basket's rearward hooked foot 94 to engage the outer surface of the lower basket's rearward, upright bail 92. Stacking between two baskets is now complete. Such interaction between foot 94 and bail 92 provides a safety feature deterring separation of an upper basket from its support, such as the lower basket, when a downward force is applied to the front rim of the upper basket.

Figure 2:
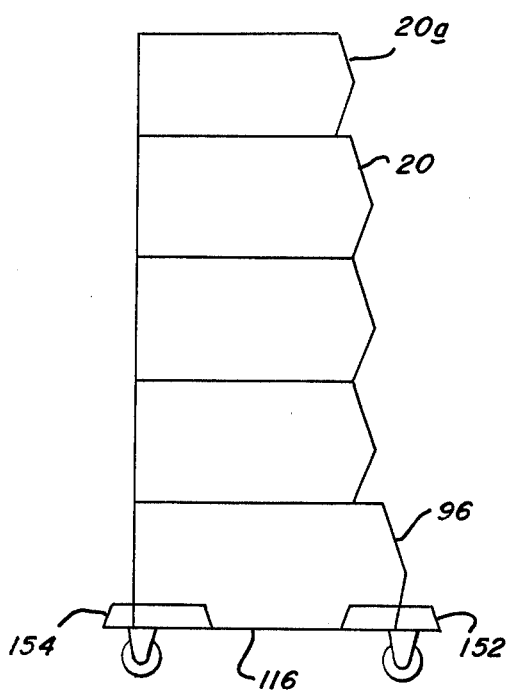
FIG. 2 is a diagrammatic end view of FIG. 1 illustrating different size stackable baskets.

The stacked baskets form a substantially rigid stacked assemblage which substantially prevents relative shifting between the stacked baskets both laterally and in front to rear directions. Such an assemblage, furthermore, enables the lower basket to be carried by the upper basket when the upper basket is lifted off the ground. It can be appreciated that numerous baskets can be stacked upon each other in this manner. Furthermore, different size/capacity baskets, such as 20a in FIG. 2, can be stacked upon each other in this manner. The stacked basket can be removed from a stacked position by reversing the aboveforesaid procedure.

Another advantage of the particular basket construction, is that during stacking, the lading-carrying interior space afforded by the stacked baskets are enlarged. The vertical extent of this enlarged interior space is dependent on the vertical extent of the peripheral end frame member 54 and 56 extending below the basket bottom.

Figure 4:
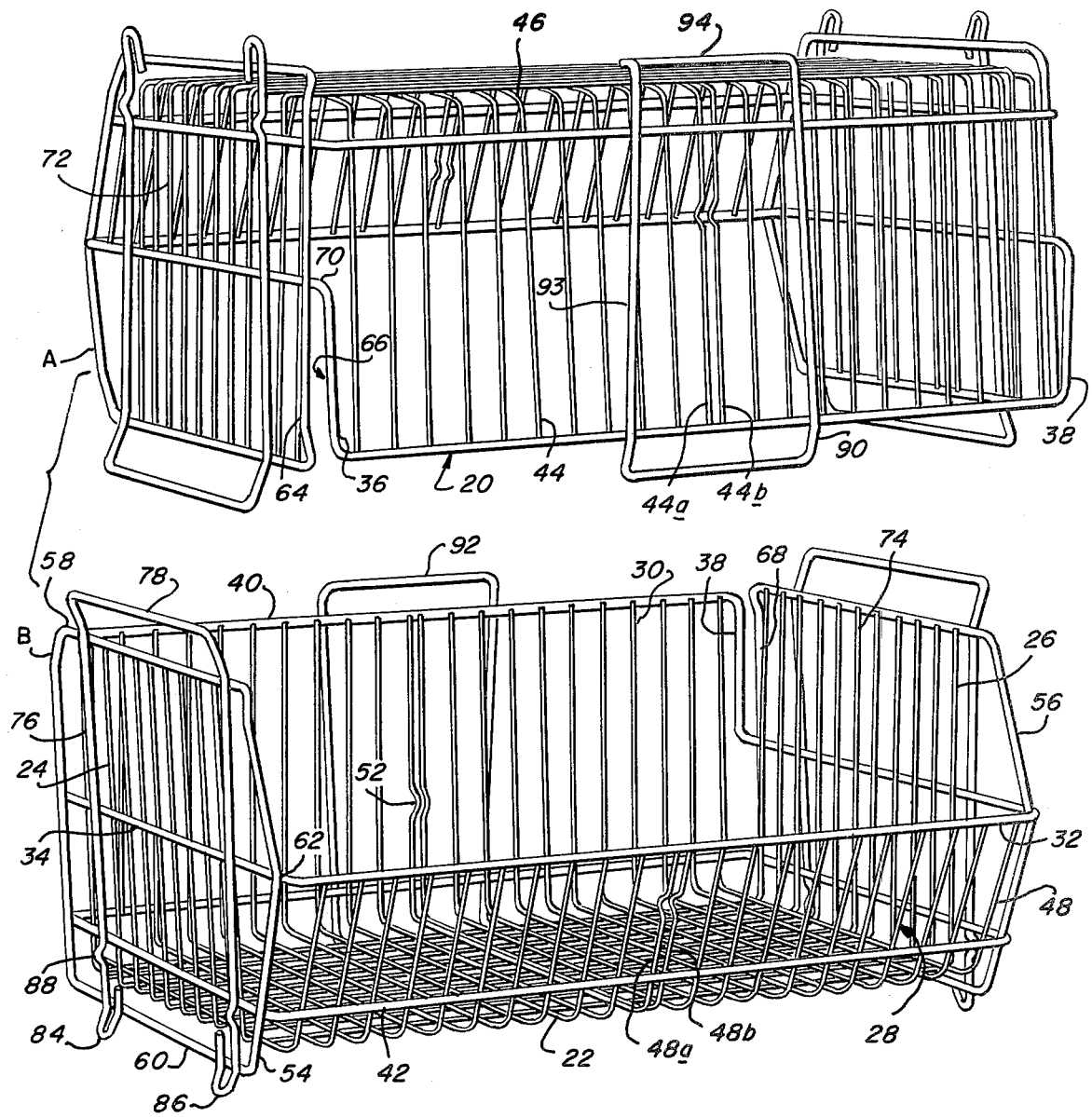
FIG. 4 is a perspective view of two stackable baskets in preparation for nesting.

In order to nest a pair of baskets as seen in the FIGS. 4 and 5, the upper basket is rotated about a longitudinal axis parallel to the basket bottom to an inverted position and is shifted or maneuvered laterally so that the end walls of the upper basket are in adjacent planes and offset from the end walls of the lower basket. The upper basket is then lowered into the lower basket so that each basket substantially occupies the interior lading-carrying space of the other basket. When the baskets are in the nested position, the partially telescoping basket assemblage is arranged to provide a left-hand pair of end walls and a right-hand pair of end walls, one of each pair belonging to the upper basket and the other belonging to the lower basket and with the innermost end wall at one end of the nesting basket belonging to the lower basket and the other innermost end wall of the nesting basket belonging to the upper basket. During nesting the innermost inverted end wall of the upper basket cooperates with the lower basket such that the upper basket's innermost endwise bail 78 engages and is supported by the lower basket's bottom wall 22, concomitantly, as the upper basket's innermost slot 66 or 68 receives the upper end of the lower basket's front wall 28. Concurrently, during nesting, the innermost upright slot of the lower basket receives the upper end of the upper basket's inverted front wall, as the lower basket's innermost end bail engages and supports the upper basket's bottom wall. Thus, the volume occupied by a pair of baskets can be substantially reduced when storing or transporting the baskets by nesting the baskets in inverted relationship to each other.

Base Basket

While a plurality of stackable baskets 20 can be stacked upon each other, it is generally desirable that the bottommost, or base, basket be constructed without downwardly extending feet. Thus, the lowermost basket in a column or tier of stacked baskets is preferably a base basket 96 as best shown in FIGS. 11 and 12.

The base basket 96 is substantially identical with the stacking baskets 20, heretofore described, with similar parts being identified with similar numerals. There does exist, however, some differences between the base basket 96 and the stacking basket 20. First, the inverted U-shaped end frame member 98 along each end wall of the base basket does not extend below the lower end runner 100 so that the base basket does not include end feet 84 and 86 nor need it include outwardly extending shoulder elements such as 88 as found in the stacking basket 20. Similarly, the rearward frame member 99, of the base basket does not descend below the lower rigidifying frame 42, thereby eliminating the rearward hooked foot 94.

Furthermore, in the base basket 96, the lower end runners 100 extend to a horizontal position intermediate the front of the basket bottom 22 and the top edge 32 of the front wall 28 with the forward tips of the lower end runner turned upward to provide forwardly vertical end extensions 102 joining the apex of the peripheral end frame member 103, the forward upright extension 102 lying generally in a common plane with and is parallel to the rearward upright extension 64 of the peripheral end frame member 103. Because of the increased length of the lower end runners 100, the lower end runners serve to increase resistance to the base basket 96 tipping over when the front side wall 28 is subjected to a downward load, such as when a child stands upon the upper rail 32 of the front wall.

The base basket further includes a horizontal wire-frame element 105 along each end wall 24 and 26 welded to the inner surfaces of the forward and rearward upward extensions 102 and 64 of the peripheral end frame member 103, and positioned generally horizontally at a height coinciding with the point where the forward upright extensions 102 intersect the front wall.

The endwise and rearward upright bails, 78 and 92, of the base basket cooperate with the endwise and rearward feet 84 and 94 of a stackable basket 20 to achieve stacking in a manner similar to the stacking solely between stackable baskets. Nesting between a pair of base baskets is also accomplished in a manner similar to the nesting of the stackable baskets 20.

The Partition

In order to separate the lading carrying space of the basket into two compartments a wire divider or partition 50 may be provided to fit into the vertical partition receiving wires 44a and 44b of the rearwall 30 and into the inclined partition-receiving wires 48a and 48b of the front wall 28. The periphery of the partition or divider is generally of the same shape and gauge as the peripheral end frame member 56 of the end wall. The peripheral or divider wire-frame member 108 is slightly thicker or greater than the horizontal spacing of the vertical wires 44a and 44b and the inclined wires 48a and 48b, so that the partition or divider snaps into and out of the partition-receiving wires of the basket. The divider can be inserted into the basket to form two separate compartments or can be removed from the basket to provide a unitary non-compartmentalized lading-carrying space.

The peripheral frame member 108 includes upper and lower rails 110 and 112 substantially equal in length to the horizontal endwise extent of the basket bottom 22. A set of parallel, vertical partition wires 114 of a gauge, size and dimension similar to the cross wires of the basket bottom are welded along aliquot sub-portions of one side of the upper and lower rails 110 and 112. When positioned, the partition 50 is substantially parallel to the end walls 24 and 26 of the basket.

It is to be understood, of course, that the basket can be constructed and designed to accommodate more than one partition along pre-selected intervals of the lading-carrying space to provide a multitude of compartments.

Basket-Supporting Dollies

Figure 1:
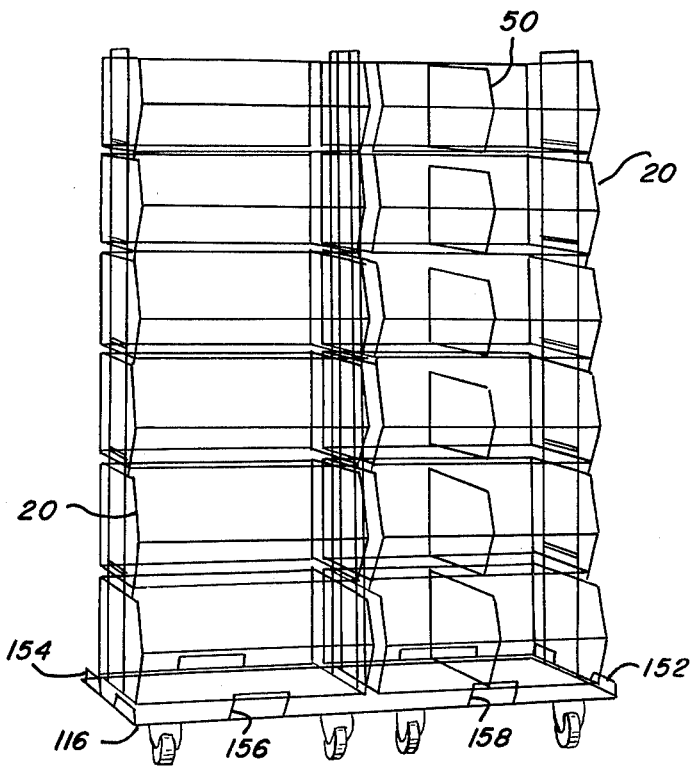
FIG. 1 is a diagrammatic perspective view of a double dolly supporting two base baskets and a plurality of stackable baskets arranged in stacking relationship.
Figure 3:
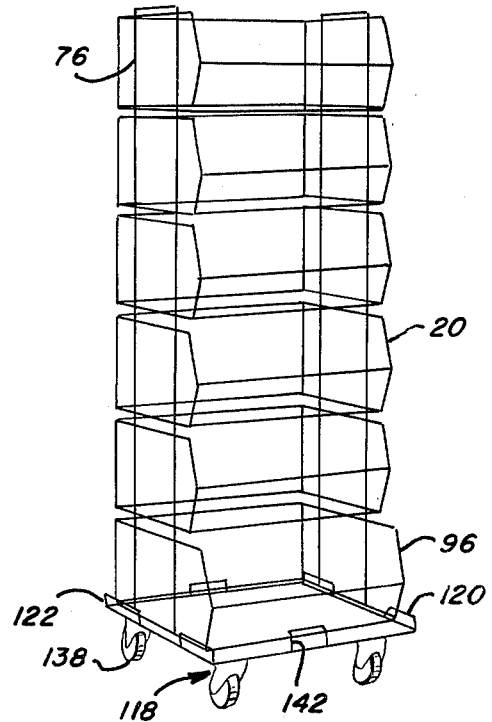
FIG. 3 is a diagrammatic perspective view of a single dolly supporting a base basket and a plurality of stackable baskets arranged in stacking relationship.

For conveniently moving a tier of stacked baskets, the base basket 96 may preferably be mounted upon a mobile support or dolly 116 or 118. FIGS. 1 and 16 illustrate a wide dolly 116 capable of having two base baskets positioned thereon, end-to-end, while FIGS. 3 and 13 illustrate a dolly 118 for a single base basket. As the goods in the basket are to be presented to the customers through the open front wall thereof, reference to the various sides of the dollies herein described follow the corresponding reference to sides of the baskets.

Referring to FIG. 13, each single dolly 118 includes a pair of forwardly and rearwardly elongated, longitudinal loop-like wire frames 120 and 122, that are spaced in parallel relationship to each other. The forwardly and rearwardly wire frames 120 and 122 each include a pair of parallel elongated legs comprising an inwardly-positioned longitudinal leg 124 and an outwardly-positioned longitudinal leg 126. The ends of the legs are interconnected and turned upward to provide substantially vertical bail-like retainers 128 and 130, to be located outwardly of, but adjacent, the end walls of the base baskets positioned on the dolly frame.

The forwardly and rearwardly wire frames are rigidly interconnected by and supporting carry two pairs of parallel endwise cross-wires 132 and 134 positioned inward of the bail-like retainers 128 and 130. The crosswires extend across and are welded to the top surfaces of the frame legs 124 and 126 to fixedly carry four support plates 136 for carrying downwardly-extending casters 138, one caster plate and one wheel being located adjacent each corner of the dolly.

Positioned parallel to the forward and rearward frame legs are a pair of sidewise longitudinal wire elements 140 spaced adjacent the outward longitudinal frame legs 124. The wire elements are welded to the top surfaces of the cross-wires 130 and 132 and terminate adjacent the bail-like end retainers 128 and 130.

Welded to the top surfaces of the inward longitudinal frame legs 124 is a crosswise loop-like wire frame 142 positioned between the pairs of cross-wires 132 and 134. The crosswise frame defines a pair of transverse parallel crosswise legs 144 which extend to a position inward of the sidewise longitudinal elements 140. The crosswise legs have ends turned upward to provide forwardly and rearwardly side bails 146 and 148. Each of the side bails are inclined slightly inwardly to provide portions that cooperate with side portions of the lower rigidifying frame member 42 adjacent the front and rear walls of the base baskets.

The wire-like parts of the single capacity dolly should be of a wire gauge, size and dimension sufficient to support the weight of a column of baskets. When it is desired to accommodate two columns of tiered baskets in side-by-side relationship, a mobile double-capacity dolly 116 may be provided as shown in FIGS. 1 and 16. The mobile double dolly is substantially similar to the single dolly 118 except the sides 150 and forwardly and rearwardly loop-like wire frames 152 and 154 are longer to accommodate two base baskets. The double dolly further includes two crosswise loop-like wire frames 156 and 158 spaced parallel to each other intermediate the endwise crosswires 160 and 162 so as to provide two sets of forwardly and rearwardly side bails 164 and 166, one set for each base basket. The double dolly shown in FIG. 16 further includes a central pair of cross-wires 168 between the two crosswise wire frames 156 and 158 to fixedly carry another pair of caster wheels 170 so that the double dolly is provided with six wheels. When desired, the double dolly may include eight caster wheels as shown in FIG. 1.

Among the advantages of the mobile stacking assemblage are:

1. From one to five stackable baskets may be tiered on a base basket for increased versatility in store layout and merchandising.
2. The baskets secure together with substantial stability without tools or special attaching hardware.
3. The mobile basket module does not require shelving for supporting the baskets.
4. Multi-tiered baskets permit the transporting of merchandise on mobile display units directly from storeroom to the selling area, thereby eliminating piece-by-piece stocking and costly multiple handling.
5. The mobile stacked assemblage makes it easier and faster for stockers to replenish displays without the use of stock trucks congesting the aisles.
6. The press-fit construction of the baskets insures rigidity and stability of the stacked baskets while moving or in position for display. Furthermore, the mobile stackable baskets permit interchangeability and flexibility of display.
7. An inverted U-shaped sign holder of extruded scratch resistant plastic or the like may engagingly hook the front wall's top edge or horizontal frame member of the stackable or base basket and include an elongated readily-visible pocket of transparent plastic for displaying a price tag, product identification or inventory code from the basket's front walls to avoid, when desired, individual marking or pricing of the merchandise in the basket. When desired, a rectangular self-clamping display frame may be attached to the front wall's top edge in either an upward or inverted position for holding a rectangular sign or the like.

It will be appreciated that numerous changes and modifications can be made to the embodiments shown herein without departing from the spirit and scope of this invention.

What is claimed and desired to be secured by Letters Patent of the United States is:

1. In a stacking basket construction wherein the basket includes spaced upright end walls extending upwardly from a basket bottom, with the end walls of similar stacked baskets being substantially vertically aligned, and frame means for each end wall defining substantially horizontal upper and lower frame runs such that a lower run of an upper basket is positioned vertically adjacent an upper run of a lower basket when the baskets are stacked; the improvement comprising, in combination: resilient upright stacking means fixedly secured to each end wall frame means including an elongated inverted U-shaped bail extending above the upper frame run and inclined outwardly therefrom, and at least one depending foot disposed in substantially vertical alignment beneath the bail and spanning a horizontal distance less than the minimum interior length of the bail, said foot extending beneath said lower frame run and cantilevered slightly outward therefrom and carrying an outwardly-projecting shoulder element above the lower frame run so that the foot of one basket may enter the bail of another basket and snap-fittingly engage therewith, the foot engaging the other basket's upper run on the outer side thereof with another portion of the foot engaging the bight of the bail on its inner side thereof and with the shoulder element of the one basket interlockingly resiliently engaging the underside of the bail of the other basket so as to provide a substantially rigid, snap-together, stacking assemblage.

2. A construction as in claim 1 wherein the stacking means includes two feet which are reverse bent to provide rounded lowermost portions that are adapted to enter another basket's bail and engage against the upper run of the other basket as two stacking baskets are aligned and moved into force-fit engagement with each other.

3. A construction as in claim 2 wherein the feet extend below the basket bottom a distance greater than the vertical extent of the bail so as to engage the upper run of another basket.

4. A construction as in claim 1 wherein the stacking means at each end wall includes two feet, and the bail and feet being integrally connected as part of a single U-shaped wire member whose legs are elongated and of greater length than the height of an end wall, and whose bight and adjacent portions of the legs serve as the inverted bail and whose distal ends of the legs serve as the feet.

5. A construction as in claim 4 further including a first horizontal frame means secured to the basket, and secured to the U-shaped wire member above the shoulder elements of the stacking means for rigidifying both the end walls of the basket and the U-shaped wire member.

6. A construction as in claim 5 including second horizontal frame means intermediate the top of the basket and the first horizontal frame means for rigidifying said legs.

7. In a stacking basket construction wherein the basket includes spaced upright end walls extending upwardly from a basket bottom, with the end walls of similar stacked baskets being substantially vertically aligned, frame means for each end wall defining substantially horizontal upper and lower frame runs such that a lower run of an upper basket is positioned vertically adjacent an upper run of a lower basket when the baskets are stacked; the improvement comprising, in combination: resilient upright stacking means fixedly secured to each end wall frame means including an elongated inverted U-shaped bail extending above the upper frame run and inclined outwardly therefrom, two depending feet disposed in substantially vertical alignment beneath the bail and together spanning a horizontal distance less than the minimum interior length of the bail, each foot extending beneath said lower frame run and cantilevered slightly outward therefrom and carrying an outwardly-projecting shoulder element above the lower frame run so that the feet of one basket may enter the bail of another basket and snap-fittingly engage therewith, with the feet also engaging the other basket's upper run, the shoulder elements of the one basket interlockingly resiliently engaging the bails of the other basket so as to provide a substantially rigid stacking assemblage, the bail and feet being integrally formed by a single U-shaped wire member whose legs are elongated and of greater length than the height of an end wall, and whose bight and adjacent portions of the legs serve as the inverted bail and whose distal ends of the legs serve as the feet, the elongated legs of the U-shaped wire member converging toward each other in the direction extending away from the bight of said U-shaped wire member so that the feet are disposed to span a horizontal dimension less the interior length of the bail.

8. In a stacking basket construction wherein the basket includes spaced upright end walls extending upwardly from a basket bottom, with the end walls of similar stacked baskets being substantially vertically aligned, frame means for each end wall defining substantially horizontal upper and lower frame runs such that a lower run of an upper basket is positioned vertically adjacent an upper run of a lower basket when the baskets are stacked; the improvement comprising, in combination: resilient upright stacking means fixedly secured to each end wall frame means including an elongated inverted U-shaped bail extending above the upper frame run and inclined outwardly therefrom, two depending feet disposed in substantially vertical alignment beneath the bail and together spanning a horizontal distance less than the minimum interior length of the bail, each foot extending beneath said lower frame run and cantilevered slightly outward therefrom and carrying an outwardly-projecting shoulder element above the lower frame run so that the feet of one basket may enter the bail of another basket and snap-fittingly engage therewith, the shoulder elements of the one basket interlockingly resiliently engaging the bails of the other basket so as to provide a substantially rigid stacking assemblage, the feet extending below the basket bottom a distance greater than the vertical extent of the bail so as to engage the upper frame run of a basket therebelow, and the lower frame run being located at a position intermediate the terminus of the feet and the basket bottom to fixedly secure and rigidify said feet.

9. In a stacking basket construction wherein the basket includes spaced upright end walls extending upwardly from a basket bottom, with the end walls of similar stacked baskets being substantially vertically aligned, frame means for each end wall defining substantially horizontal upper and lower frame runs such that a lower run of an upper basket is positioned vertically adjacent an upper run of a lower basket when the baskets are stacked; the improvement comprising, in combination: resilient upright stacking means fixedly secured to each end wall frame means including an elongated inverted U-shaped bail extending above the upper frame run and inclined outwardly therefrom, at least one depending foot disposed in substantially vertical alignment beneath the bail and spanning a horizontal distance less than the minimum interior length of the bail, said foot extending beneath said lower frame run and cantilevered slightly outward therefrom and carrying an outwardly-projecting shoulder element above the lower frame run so that the foot of one basket may enter the bail of another basket and snap-fittingly engage therewith, the foot also engaging the other basket's upper run, the shoulder elements of the one basket interlockingly resiliently engaging the bails of the other basket so as to provide a substantially rigid stacking assemblage, and at least one side wall interposed between the end walls and fixedly carrying an elongated inverted U-shaped side bail extending above the side wall and an inwardly-hooking bail-like foot extending below the side wall, the length of the foot being less than the length of the bail for permitting entry of the foot into the bail of another basket and cooperating to engage the other basket's bail during stacking so as to enhance the stability of the stacked assemblage.

10. A construction as in claim 9 wherein the stacking means is a continuous wire member having downwardly converging legs of greater length than the height of the side wall so that the exterior length of the foot is less than the interior length of the bail.

11. In a nesting basket construction wherein the basket includes a basket bottom, spaced upright side walls, and spaced, substantially vertical end walls, the improvement comprising, in combination:

upright slot-defining means provided in each of the end walls, adjacent the uppermost ends of one side wall, for slidably-receiving the upper end of the other side wall of a similar-type basket during nesting, such that when two such baskets are inverted by rotation of 180° about a longitudinal axis parallel to the basket bottom and are shifted laterally so that the end walls of two baskets are in adjacent planes, the two baskets may be partially telescoped into a nesting relationship.

12. A basket construction as in claim 11 wherein the end walls are of a vertical size and dimension so that during nesting at least one end wall of each basket rigidly engages the bottom of the other basket.

13. A basket construction as in claim 11 further including horizontal frame means securely interconnecting and rigidifying the end walls and the other side wall along a plane interposed between the top and bottom of the basket so as to define both the uppermost limits of the other side wall and the lowermost limits of the slots.

14. A basket construction as in claim 11 wherein one of said side walls defines a rear wall and the other side wall defines an outwardly sloping front wall of lesser height than the rear wall so as to define an access opening into the interior of the basket; each of said end walls including peripheral frame means bounding the sides of the end wall, and defining both the upright extent and horizontal limit of the slots.

15. A basket construction as in claim 14 including a bail extending above the peripheral frame means for engaging the bottom of the other basket, said bail ascending to a height for vertically spacing the lowermost limits of the slots from the front wall of the other basket.

16. A basket construction as in claim 14 wherein each of the side walls further includes upright stacking means extending from the peripheral frame means.

17. A unitary stackable and nestable basket construction including only a plurality of interconnected wire-like elements providing a basket bottom, spaced upright side walls, and spaced, substantially vertical end walls, comprising, in combination:

frame means for each end wall defining substantially horizontal upper and lower frame runs such that a lower run of an upper basket is positioned vertically adjacent an upper run of a lower basket when the baskets are stacked;

resilient upright stacking means fixedly secured to each end wall frame means including an elongated inverted U-shaped bail extending above the upper frame run and inclined outwardly therefrom, and at least one depending foot disposed in substantially vertical alignment beneath the bail and spanning a horizontal distance less than the minimum interior length of the bail, said foot extending beneath said lower frame run and cantilevered slightly outward therefrom and carrying outwardly-projecting shoulder element above the lower frame run so that the foot of one basket may enter the bail of another basket and snap-fittingly engage the other basket's upper run, as the shoulder element of the one basket interlockingly resiliently engages the bail of the other basket so as to provide a substantially rigid stacking assemblage; and upright slot-defining means provided in each of the end walls, adjacent the uppermost ends of one side wall, for slidably-receiving the upper end of the other side wall of a similar-type basket during nesting, such that when two such baskets are inverted by rotation of 180° about a longitudinal axis parallel to the basket bottom and shifted laterally so that the end walls of two baskets are in adjacent planes, the two baskets may be partially telescoped into a nesting relationship.

* * * * *